United States Patent
Kunze et al.

(10) Patent No.: US 11,466,605 B2
(45) Date of Patent: Oct. 11, 2022

(54) MOUNTING MAT FOR AN EXHAUST GAS TREATMENT DEVICE

(71) Applicant: 3M INNOVATIVE PROPERTIES COMPANY, St. Paul, MN (US)

(72) Inventors: Ulrich E. Kunze, Juechen (DE); Claus Middendorf, Neuss (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/533,470

(22) PCT Filed: Dec. 10, 2015

(86) PCT No.: PCT/US2015/064966
§ 371 (c)(1),
(2) Date: Jun. 6, 2017

(87) PCT Pub. No.: WO2016/100079
PCT Pub. Date: Jun. 23, 2016

(65) Prior Publication Data
US 2017/0335737 A1     Nov. 23, 2017

(30) Foreign Application Priority Data

Dec. 18, 2014  (EP) ..................................... 14199045

(51) Int. Cl.
*F01N 3/28* (2006.01)
*F01N 3/021* (2006.01)

(52) U.S. Cl.
CPC .......... *F01N 3/2871* (2013.01); *F01N 3/0211* (2013.01); *F01N 3/2839* (2013.01);
(Continued)

(58) Field of Classification Search
CPC ............. F01N 2350/00; F01N 2350/02; F01N 2450/02; F01N 3/0211; F01N 3/2839; F01N 3/2853; F01N 3/2871; Y02T 10/20
See application file for complete search history.

(56) References Cited

U.S. PATENT DOCUMENTS 5,250,269 A   10/1993  Langer
5,332,699 A    7/1994  Olds et al.
(Continued)

FOREIGN PATENT DOCUMENTS

EP      2042636      4/2009
EP      2487342      8/2012
(Continued)

OTHER PUBLICATIONS

International Search Report for PCT International Application No. PCT/US2015/064966, dated Mar. 14, 2016, 5 pgs.

*Primary Examiner* — Phutthiwat Wongwian
*Assistant Examiner* — Diem T Tran
(74) *Attorney, Agent, or Firm* — Carlos M. Téllez Rodriguez; 3M Innovative Properties Company

(57) ABSTRACT

A mounting mat (4) for an exhaust gas treatment device (10), the mounting mat (4) comprises two opposing main surfaces (5, 6) and at least one edge surface (7) extending between the main surfaces; at least one portion of the at least one edge surface comprises a protection coating comprising inorganic particles (15), and the inorganic particles have an average diameter of at least 1 μm.

18 Claims, 2 Drawing Sheets

(52) U.S. Cl.
CPC ........ *F01N 3/2853* (2013.01); *F01N 2350/00* (2013.01); *F01N 2350/02* (2013.01); *F01N 2450/02* (2013.01); *Y02T 10/12* (2013.01)

(56) References Cited

U.S. PATENT DOCUMENTS

| | | | |
|---|---|---|---|
| 5,585,312 | A | 12/1996 | TenEyck et al. |
| 5,714,421 | A | 2/1998 | Olds et al. |
| 5,874,375 | A | 2/1999 | Zoitas et al. |
| 5,882,608 | A | 3/1999 | Sanocki et al. |
| 6,245,301 | B1 * | 6/2001 | Stroom ................. F01N 3/0211 422/179 |
| 7,704,459 | B2 | 4/2010 | Merry et al. |
| 8,133,443 | B2 | 3/2012 | Merry |
| 8,178,052 | B2 * | 5/2012 | Dietz ......................... C09J 7/38 422/179 |
| 8,211,373 | B2 * | 7/2012 | Olson .................. F01N 3/2857 422/179 |
| 8,617,475 | B2 * | 12/2013 | Dietz .................... C04B 41/009 422/179 |
| 9,452,719 | B2 | 9/2016 | Chauhan ............. B60R 13/0876 |
| 2004/0234436 | A1 * | 11/2004 | Howorth ................. C04B 30/02 422/245.1 |
| 2005/0266992 | A1 * | 12/2005 | Ohno .................. B01D 46/2455 502/439 |
| 2007/0269354 | A1 | 11/2007 | Sarda et al. |
| 2008/0175764 | A1 * | 7/2008 | Sako ...................... F01N 3/2864 422/177 |
| 2009/0022633 | A1 * | 1/2009 | Tomosue .............. F01N 3/2853 422/177 |
| 2009/0304560 | A1 * | 12/2009 | Dietz .................... F01N 3/2864 422/179 |
| 2010/0115931 | A1 | 5/2010 | Okabe |
| 2011/0182777 | A1 * | 7/2011 | Dietz .................... C04B 41/009 422/168 |
| 2012/0183449 | A1 * | 7/2012 | Beauharnois ....... C04B 35/6224 422/177 |

FOREIGN PATENT DOCUMENTS

| | | |
|---|---|---|
| JP | 2002206421 | 7/2002 |
| WO | WO 99/46028 | 9/1999 |
| WO | WO-2005105427 | * 11/2005 |
| WO | WO 2008/156942 | 12/2008 |
| WO | WO 2010/024920 | 3/2010 |
| WO | WO 2010/122337 | 10/2010 |
| WO | WO 2012/021270 | 2/2012 |

* cited by examiner

MOUNTING MAT FOR AN EXHAUST GAS TREATMENT DEVICE

CROSS REFERENCE TO RELATED APPLICATIONS

This application is a national stage filing under 35 U.S.C. 371 of PCT/US2015/064966, filed Dec. 10, 2015, which claims the benefit of European Application No. 14199045.7, filed Dec. 18, 2014, the disclosures of which are incorporated by reference in their entireties herein.

FIELD OF THE INVENTION

The invention relates to a mounting mat for an exhaust gas treatment device, and in particular to, the mat comprising a protection coating of inorganic particles. The invention also relates to a method of making a mounting mat, and in particular to, the use of a protection coating on an edge surface to provide an erosion robust and fiber shedding robust mounting mat.

BACKGROUND

Exhaust gas purification systems using Pollution control elements, e.g. ceramic catalytic converters are well known as means for removing carbon monoxide (CO), hydrocarbons (HC), and nitrogen oxides (NOx) contained in exhaust gases from automobile engines. Ceramic catalytic converters basically accommodate, for example, a honeycomb-shaped ceramic catalyst carrier (also referred to as "catalyst element") inside a metal casing or housing. Other exhaust gas purification systems using as a pollution control element ceramic filters for filtering e.g. particles out of an exhaust gas, are known as well.

It is also well-known that there are ceramic catalytic converters or filters of a variety of types, but usually a configuration is employed in which a gap between a casing and a catalyst carrier accommodated therein is filled with a holding or mounting material (e.g., in the form of a mat) generally obtained by combining inorganic fibers with an (liquid or past-like) organic binder. As a result, the mounting material filling the gap holds the catalyst carrier or filter and can prevent mechanical shocks caused by impacts, vibrations, and the like from being unintentionally applied to the catalyst carrier or filter. Accordingly, no fracture or movement of the catalyst carrier or filter occurs in exhaust gas treatment devices of such a configuration. Furthermore, the above-described mounting material has a thermally insulating function in addition to the holding function.

When an exhaust gas treatment device (e.g., a catalytic converter or a diesel particulate filter) is loaded into a casing, e.g. a metal housing, a pressure insertion system is generally employed such that a mounting or holding material is wound around the pollution control element and integrated therewith and the integrated body is thereafter inserted under a pressure into e.g. a cylindrical casing. Other shapes of the pollution control element such as for example squared forms are known as well. Pollution control element holding materials of various types have been suggested to prevent inorganic fibers contained in the holding material from being scattered or shredded in the air or from being eroded during use of the exhaust gas treatment device.

For example WO 2012/021270 A2 discloses a mounting mat for an exhaust gas treatment device with an edge protectant. The edge protectant protects the mounting mat against erosion from hot gases encountered during the normal operation of the exhaust gas treatment device. The edge protectant remains flexible after it has been applied to the mounting mat and substantially dried. The edge protectant comprises a substantially non-cross-linkable polymer that thermally decomposes leaving a gas erosion resisting agent adsorbed in the mounting mat.

WO 2010/024920 discloses a mounting mat for an exhaust gas treatment device comprising a substantially dry flexible edge protectant comprising a polymer and a gas erosion resisting agent absorbed thereon. The gas erosion resisting agent comprises an inorganic particulate.

Other edge protectants known in the industry are not flexible and stiffen the mat edge area once they are dried. Mounting mats treated with these edge protectants can only be wound around the pollution control element as long as the erosion resisting material is not dried. Otherwise they will crack.

SUMMARY OF THE INVENTION

In view of the prior art, there is still a need to provide a mounting mat for an exhaust gas treatment device that provides good fiber shedding properties, good erosion properties or both. There is also a need to provide a mounting mat with the above mentioned properties that can easily be handled during the manufacturing process of an exhaust gas treatment device.

The present invention provides a mounting mat for an exhaust gas treatment device. In one aspect, the mounting mat according to the invention comprises two opposing main surfaces and at least one edge surface extending between the main surfaces. At least one portion of at least one edge surface comprises a protection coating comprising inorganic particles, wherein the inorganic particles have an average diameter of at least 1 µm.

The mounting mat according to the invention may comprise any mat like shape that can be used for mounting pollution control device, e.g. a catalytic converter or a diesel particulate filter, within a metal housing. Usually, mounting mats comprise a rectangular shape and they usually have a certain thickness. They may provide several edge surfaces that are arranged such that they surround the main surface. This shape leads to a mounting mat with two opposing main surfaces and several edge surfaces extending between the main surfaces and surrounding them. The mounting mat may comprise a shape, where portions of the mat engage with other portions of the mat in a mounted stage. One example for such portions may be protrusions on one end of a mounting mat that engage with a reception on the opposite end of the mounting mat.

Typically, the opposing main surfaces are basically flat with a structure determined by the materials used for the mounting mat, e.g. fibers.

According to the invention, the mounting mat comprises a coating that protects the mounting mat or parts of it against fiber shedding and against erosion. The protection coating comprise inorganic particles, wherein the inorganic particles have an average diameter of at least 1 µm.

The particle size is determined with laser diffraction according to DIN ISO 13320: 2009 (E). The term "average diameter" as used in this application is defined as the mode of the diameter distribution of particles, which is the diameter which appears most often in a distribution of particles.

Surprisingly it has been found, that inorganic particles with an average diameter of at least 1 µm being brought onto at least one portion of at least one edge surface provide advantages relating to fiber shedding during handling of the mounting mat as well as advantages relating to erosion during the use of a mounting mat. By bringing an edge protectant according to the invention onto at least one portion of at least one edge surface fibers on that edge get fixed by the inorganic particles, which prevents fiber shedding. In addition, the inorganic particles help close the surface to a certain extent, which helps during the use of the mounting mat to protect it against erosion.

BRIEF DESCRIPTION OF THE DRAWINGS

The invention will now be described in more detail with reference to the following Figures exemplifying particular embodiments of the invention.

DETAILED EMBODIMENT DESCRIPTION

Figure 1:
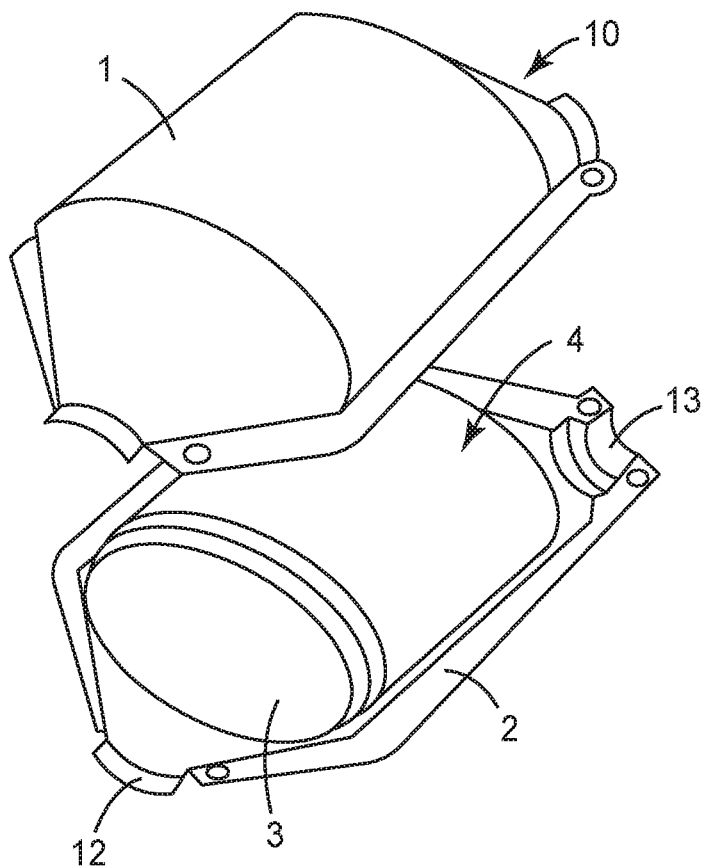
FIG. 1 is an exploded perspective view of an exhaust gas treatment device according to the invention.

According to one embodiment of the invention, the mounting mat according to the invention comprises inorganic fibers. Fibers used in the present invention are those fibers that are capable of withstanding the temperatures of the exhaust gas to which they may be exposed.

Typically, the fibers used are inorganic fibers including refractory ceramic fibers, biosoluble ceramic fibers, glass fibers, and polycrystalline inorganic fibers. Examples of inorganic fibers materials include alumina, silica, alumina-silica such as mullite, glass, ceramic, carbon, silicon carbide, boron, aluminoborosilicate, zirconia, titania, etc. These inorganic materials may be used singly, or at least two of them may be mixed and used in combination. For example, the inorganic fiber material may comprise alumina alone, or another inorganic material may further be used in combination with alumina, such as silica. Alumina-silica fiber materials may contain further metal oxides such as sodium, potassium, calcium, magnesium, and boron oxides.

Ceramic fibers which are useful in the mounting mat include polycrystalline oxide ceramic fibers such as mullites, alumina, high alumina aluminosilicates, aluminosilicates, zirconia, titania, chromium oxide and the like. Preferred fibers, which are typically high alumina, crystalline fibers, comprise aluminum oxide in the range from about 67 to about 98 percent by weight and silicon oxide in the range from about 33 to about 2 percent by weight. These fibers are commercially available, for example, under the trade designation "NEXTEL 550" from the 3M Company, Saffil™ available from Unifrax Maftec available from Mitsubishi Chemical Corp. (Tokyo, Japan), FIBERMAX™ from Unifrax, (Niagara Falls, N.Y.), and ALTRA™ fibers (Rath GmbH, Germany).

Suitable polycrystalline oxide ceramic fibers may further include aluminoborosilicate fibers preferably comprising aluminum oxide in the range from about 55 to about 75 percent by weight, silicon oxide in the range from less than about 45 to greater than zero (preferably, less than 44 to greater than zero) percent by weight, and boron oxide in the range from less than 25 to greater than zero (preferably, about 1 to about 5) percent by weight (calculated on a theoretical oxide basis as $Al_2O_3$, $SiO_2$, and $B_2O_3$, respectively).

In a further embodiment, the inorganic fibers used may comprise heat treated ceramic fibers sometimes called annealed ceramic fibers. Annealed ceramic fibers may be obtained as disclosed in U.S. Pat. No. 5,250,269 or WO 99/46028. According to the teaching of these documents, annealed ceramic fibers may be obtained by annealing melt-formed refractory ceramic fibers at a temperature of at least 700° C. By annealing the ceramic fibers, fibers are obtained that have an increased resilience. Typically, a resilience value of at least 10 kPa may be obtained under the test conditions set out in U.S. Pat. No. 5,250,269. The melt-formed refractory ceramic fibers suitable for annealing, can be melt-blown or melt-spun from a variety of metal oxides, preferably a mixture of $Al_2O_3$ and $SiO_2$ having from 30 to 70% by weight of alumina and from 70 to 30% by weight of silica, preferably about equal parts by weight. The mixture can include other oxides such as $B_2O_3$, $P_2O_5$, and $ZrO_2$. Suitable melt-formed refractory ceramic fibers are available from a number of commercial sources and include these known under the trade designation "Fiberfrax" from Unifrax, Niagara Falls, N.Y., "Cerafiber" and "Kaowool" from Morgan Thermal Ceramics Co., Augusta, Ga.

In a particular embodiment, heat treated glass fibers may be used. It has been found that heat treating glass fibers may improve the heat resistance of the glass fibers. Glass fibers may be heat treated at a temperature of up to about 50 or 100° C. below the softening or melting point of the glass. The heat treated glass fibers may be used alone or in combination with any of the herein described fibers.

In a particular embodiment in connection with the present invention, the inorganic fibers of the mounting mat may comprise biosoluble fibers. As used herein, "biosoluble fibers" refers to fibers that are decomposable in a physiological medium or a simulated physiological medium. Physiological medium includes, but is not limited to, those bodily fluids typically found in the respiratory tract such as, for example, the lungs of animals or humans.

Biosoluble inorganic fibers suitable for use in the present invention typically include, but are not limited to, inorganic oxides such as, for example, $Na_2O$, $K_2O$, CaO, MgO, $P_2O_5$, $Li_2O$, BaO, or combinations thereof with silica. Other metal oxides or other ceramic constituents can be included in the biosoluble inorganic fibers even though these constituents, by themselves, lack the desired solubility but are present in low enough quantities such that the fibers, as a whole, are still decomposable in a physiological medium. Such metal oxides include, for example, $Al_2O_3$, $TiO_2$, $ZrO_2$, $B_2O_3$, and iron oxides. The biosoluble inorganic fibers can also include metallic components in amounts such that the fibers are decomposable in a physiological medium or simulated physiological medium.

In one embodiment, the biosoluble inorganic fibers include oxides of silica, magnesium, and calcium. These types of fibers are typically referred to as calcium magnesium silicate fibers. The calcium magnesium silicate fibers usually contain less than about 10 weight percent aluminum oxide. In some embodiments, the fibers include from about 45 to about 90 weight percent $SiO_2$, up to about 45 weight percent CaO, up to about 35 weight percent MgO, and less than about 10 weight percent $Al_2O_3$. For example, the fibers can contain about 55 to about 75 weight percent $SiO_2$, about 25 to about 45 weight 30 percent CaO, about 1 to about 10 weight percent MgO, and less than about 5 weight percent $Al_2O_3$.

In a further embodiment, the biosoluble inorganic fibers include oxides of silica and magnesia. These types of fibers are typically referred to as magnesium silicate fibers. The magnesium silicate fibers usually contain from about 60 to about 90 weight percent $SiO_2$, up to about 35 weight percent MgO (typically, from about 15 to about 30 weight percent MgO), and less than about 5 weight percent $Al_2O_3$. For example, the fibers can contain about 70 to about 80 weight percent $SiO_2$, about 18 to about 27 weight percent MgO, and less than about 4 weight percent of other trace elements. Suitable biosoluble inorganic oxides fibers are described in U.S. Pat. No. 5,332,699 (Olds et al.); U.S. Pat. No. 5,585,312 (Ten Eyck et al.); U.S. Pat. No. 5,714,421 (Olds et al.); U.S. Pat. No. 5,874,375 (Zoitas et al.); and European Patent Application 02078103.5 filed on Jul. 31, 2002. Various methods can be used to form biosoluble inorganic fibers including, but not limited to, sol gel formation, crystal growing processes, and melt forming techniques such as spinning or blowing.

In a particular embodiment in connection with the present invention, the above mentioned biosoluble fibers are used in combination with another inorganic fiber, in particular with any of the glass fibers disclosed above including heat treated glass fibers. When used in combination with one or more other inorganic fibers (i.e. non biosoluble fibers), the biosoluble fibers may be used in an amount between 97% and 10% based on the total weight of inorganic fibers. In a particular embodiment the amount of biosoluble fibers is between 95% and 30% based on the total weight of inorganic fibers.

The inorganic fibers for use with the present invention may have an average diameter of from about 1 μm to 50 μm, more preferably about from 2 μm to 14 μm, and most preferably from 4 μm to 10 μm. When the inorganic fibers have an average diameter less than about 4 μm, the portion of respirable and potentially hazardous fibers may become significant. In a particular embodiment, fibers having a different average diameter may be combined to make a mounting mat.

Furthermore, there is no specific limitation on the length of the inorganic fibers, similarly to the average diameter. However, the inorganic fibers typically have an average length of from about 0.01 mm to 1000 mm, and most preferably about 0.5 mm to 300 mm. In a particular embodiment, fibers having a different average length may be combined in making a mounting mat. Mounting mats of short and long fibers may have particular advantages, in particular, the cold holding power may be improved and good results can be achieved in a hot vibration test.

According to another embodiment, the mounting mat is an intumescent mounting mat, comprising intumescent material disposed in the mat. The present invention can be used for non-intumescent mats as well as. An intumescent mat is a mat that contains an intumescent material. As used herein, "intumescent material" means a material that expands, foams, or swells when exposed to a sufficient amount of thermal energy. As used herein, "non-intumescent mat" means a mat that does not contain any intumescent material or at least not enough of an intumescent material to contribute a significant amount to the holding pressure exerted by the mounting mat.

Useful intumescent materials for use in making an intumescent mat include, but are not limited to, unexpanded vermiculite ore, treated unexpanded vermiculite ore, partially dehydrated vermiculite ore, expandable graphite, mixtures of expandable graphite with treated or untreated unexpanded vermiculite ore, processed expandable sodium silicate, for example EXPANTROL™ insoluble sodium silicate, commercially available from 3M Company, St. Paul, Minn., and mixtures thereof. An example of a desirable commercially available expandable graphite material is GRAFOIL™ Grade 338-50 expandable graphite flake, from UCAR Carbon Co., Inc., Cleveland, Ohio. In a particular embodiment, the intumescent material may be included in and distributed in the fiber mat.

The mounting may also comprise a binder or additives e.g. such as for example nanoparticles. Examples for binders, that can be used within the mounting mat according to the invention are acrylic resins, styrene-butadiene resins, acrylonitrile resins, polyurethane resins, natural rubbers, and poly(vinyl acetate) resins supplied in the form of a latex, siloxane or the like.

According to another embodiment, the protection coating comprises inorganic particles having an average diameter of at least 1 μm and a binder. The binder may help to increase the effect of the invention. Suitable binders may include the binders mentioned above.

According to another embodiment, the at least one portion of the at least one edge surface that comprises a protection coating is positioned on the edge surface facing an entering exhaust gas, when the mounting mat is assembled in an exhaust gas treatment device. Having the protection coating on the edge that faces the entering exhaust gas, when the mounting mat is assembled in an exhaust gas treatment device, provides the advantage of preventing fiber shedding during handing of the mat and of protecting the edge of the mounting mat that is mostly effected by erosion.

According to another embodiment, the at least one portion of at least one edge surface that comprises a protection coating is positioned on the edge surface facing away from an entering exhaust gas, when the mounting mat is assembled in an exhaust gas treatment device. Having the protection coating on the edge that faces away from the entering exhaust gas provides the advantage of protecting one edge portion against fiber shedding during handling of the mat, e.g. during manufacturing.

It is also possible, that the protection coating is present on both parallel edge surfaces facing away from an entering exhaust gas or facing towards an entering exhaust gas, when the mounting mat is assembled in an exhaust gas treatment device.

According to another embodiment, it is also possible, to comprise the protection coating comprising inorganic particles, having an average diameter of at least 1 μm on one entire edge surface. Having the protection coating on one entire surface provides a better protection against fiber shedding during handling of the fiber mat, since the entire edge surface is covered. It also provides an optimal protection against erosion since all edge surfaces, that might be effected by erosion are protected. It is also possible to provide the protection coating on more than one or on all edge surfaces of the mounting mat, which provides even better protection against fiber shredding and erosion, since more surfaces are covered.

According to another embodiment of the invention, the average diameter of the inorganic particles of the protection coating lies within a range of 1 μm to 50 μm, preferably 10 μm to 150 μm and even more preferably 20 μm to 100 μm.

According to another embodiment of the invention, the inorganic particles of the protection coating are arranged, located and/or disposed on the peripheral surface of the at least one portion of the at least one edge surface. In other words, the inorganic particles do not migrate into the mounting mat and/or they are not absorbed from the mounting mat, but they stay on the surface. The ability to stay on the surface of the mounting mat depends on the size of the particles as well as on the concentration of the slurry of inorganic particles that is prepared when applying the protection coating on the mounting mat. The concentration of the slurry should be selected such, that the particles do not penetrate into the mat and that the energy needed for drying the mat after the protection coating has been applied is not too high.

The advantage of having the inorganic particles on the peripheral surface of a mounting mat is that the amount of particles needed is reduced, which makes the mounting mat according to the invention to a cost effective mounting mat. Secondly the mounting mat stays flexible, even after the slurry of inorganic particles has been applied and the mat has been dried. The term "flexible" refers to the mat being flexible enough so that it can be bend around a catalyst or filter element during manufacturing of the exhaust gas cleaning device, even if the mat has been dried after applying the slurry of inorganic particles.

According to another embodiment, the inorganic particles comprise one or more of the following materials, vermiculite—e.g. expanded vermiculite, grounded expanded vermiculite or delaminated vermiculite—mica; kaolinite; clays; kaolin; bentonite; laponite; hectorite; saponite; montmorillonite and/or boehmite. Those materials are for example commercially available as Microlite® Vermiculite Dispersions (expanded vermiculite) from Grace Company, Columbia, United States; as aqueous vermiculite dispersion Aqueous Vermiculite Disperion (DM 338) from Dupré, Newcastle-under-Lyme, England; or Disperal Boehmite from Sasol Limited, Johannesburg, South Africa. The particles suitable as edge protectant are preferably water swellable. It is of course also possible to use a mixture of one or more of the above mentioned particles.

The invention also relates to a method of making a mounting mat for an exhaust gas treatment device according to any of the preceding embodiments, the method comprising the steps of:
  providing a mounting mat, the mat comprising two opposing main surfaces and at least one edge surface extending between the main surfaces;
  providing at least one slurry of inorganic particles, the particles having an average diameter of at least 1 µm;
  bringing the slurry of inorganic particles onto at least one portion of at least one edge surface of the mounting mat.

The method according to the invention provides an effective method of applying a coating onto a surface of a mounting mat.

According to one embodiment of the invention the slurry comprises water and inorganic particles. The water helps the inorganic particles to create a binding between the inorganic particles and the fibers of the mounting mat so that the inorganic particles are attached to the fibers.

According to another embodiment of the invention, the slurry of inorganic particles is sprayed onto the at least one portion of at least one edge surface of the mounting mat. The slurry may be sprayed by using a spray gun. It is also possible to dip a mat into the slurry. Depending on the time, that mat is dipped into the slurry and on the concentration of the slurry, good results according to the invention can be generated.

According to another embodiment, the method according to the invention comprises a drying step. The drying step may take place after the slurry of inorganic particles has been brought onto at least one portion of at least one edge surface of the mounting mat. It may take place directly after that step. But it is also possible that another step takes place in between. Possible drying steps may include for example drying at ambient conditions, IR-surface drying, hot air surface drying and/or drying in an oven.

According to another embodiment, the method according to the invention comprises the following steps:
  providing several mounting mats;
  putting the several mounting mats onto one stack;
  bringing the slurry of inorganic particles onto at least one portion of one side of the stack of mounting mats in order to coat at least one portion of at least one edge surface of each mounting mat.

This method comprises an even more effective way of applying a coating onto a surface of a mounting mat since it allows coating of several mounting mats at the same time. Since only the edge surface needs to be treated, piling them up and spraying the slurry onto the edge surfaces of the pile of mounting mats is a very simple way of coating edge surfaces. A card board may be used to cover the main surface of the top mounting mat.

The invention also refers to the use of a coating comprising inorganic particles, the inorganic particles having an average diameter of at least 1 µm, as an edge protection coating for mounting mats for exhaust gas treatment devices, the mounting mat providing improved fiber shedding and erosion properties.

The invention will now be described in more detail with reference to the following examples exemplifying particular embodiments of the invention.

EXAMPLES

Example 1

5 samples of 100 mm×100 mm were cut from the commercially available mounting mat Interam™ 5000NC. The samples were placed on top of each other to form a stack and the upper mat sample was covered with a cardboard paper of the same size. A slurry of expanded Vermiculite particles—Aqueous Vermiculite Dispersion (DM338) from Dupré, which was diluted to 5% by weight solids content—was sprayed evenly on all 4 exposed edge surfaces using a paint spray gun. The samples were let dry in the laboratory over night until they have reached a constant weight. The coating weight of the dried expanded Vermiculite particles on the edge surface of the mat samples was 3 g/m².

The coated mat samples were tested for fiber shedding, edge erosion and surface cracking according to the test methods described below.

Example 2

Example 2 was made in the same manner as example 1, but the coating weight of the expanded Vermiculite particles on the edge surface of the mat samples was 15 g/m².

Example 3

Example 3 was made in the same manner as example 1, but the coating weight of the expanded Vermiculite particles on the edge surface of the mat samples was 29 g/m².

Example 4

Example 4 was made in the same manner as example 1, but the coating weight of the expanded Vermiculite particles on the edge surface of the mat samples was 55 g/m².

Example 5

Example 5 was made in the same manner as example 1, but a 5% by weight slurry of boehmite Disperal 60 particles was used instead of the expanded Vermiculite particle slurry. The coating weight of the dried Disperal 60 particles on the edge surface of the mat samples was 10 g/m².

Example 6

Example 6 was made in the same manner as example 5, but the coating weight of the dried Disperal 60 particles on the edge surface of the mat samples was 31 g/m².

Comparative Example 1

A 100 mm×100 mm sample of Interam™ 5000NC without protection coating was tested for fiber shedding, edge erosion and surface cracking.

Comparative Example 2

Comparative Example 2 was made in the same manner as example 1, but a 5% slurry of boehmite Disperal P3 particles was used instead of the expanded Vermiculite particle slurry. The coating weight of the dried Disperal P3 particles on the edge surface of the mat samples was 56 g/m².

Comparative Example 3

Samples of 100 mm×100 mm were cut from the commercially available mounting mat Interam™ 5000NC. The samples were dipped into a 1% by weight suspension of Disperal P3 particles for about 20 seconds, so that the slurry could penetrate about 1 cm into the side of the mat. This was repeated for all 4 sides of the mat samples. Then the samples were dried to constant weight in a laboratory oven at 110° C.

Comparative Example 4

Samples of 100 mm×100 mm were cut from the commercially available mounting mat Interam™ 5000NC. The commercially available edge protectant CeProTec Rigidizer B was diluted to 1/10$^{th}$ and the mat samples were dipped into the solution for about 20 seconds, so that the slurry could penetrate about 1 cm into the side of the mat. This was repeated for all 4 sides of the mat samples. Then the samples were dried to constant weight in a laboratory oven at 110° C.

All coated mat samples were tested for fiber shedding, edge erosion and surface cracking according to the test methods described below.
Materials Used for Edge Coating:

| Material | Average Particle Size - Mode (μm) | Particle Size Range (μm) |
| --- | --- | --- |
| Expanded Vermiculite - Aqueous Vermiculite Dispersion (DM338) | 43 | 10-200 |
| Boehmite - Disperal P60 | 1.7 | 1.1-2.8 |
| Boehmite - Disperal P3 | 0.097 | 0.014-0.200 |

Results:

| Example | Fiber Shedding (% weight loss) | Erosion (g) | Cracking |
| --- | --- | --- | --- |
| Example 1 | 0.32 | 0.06 | no cracking |
| Example 2 | 0.33 | 0.04 | no cracking |
| Example 3 | 0.29 | 0.02 | no cracking |
| Example 4 | 0.15 | 0.02 | no cracking |
| Example 5 | 0.43 | 0.04 | no cracking |
| Example 6 | 0.34 | 0.04 | no cracking |
| Comparative Example 1 | 1.09 | 0.12 | no cracking |
| Comparative Example 2 | 1.01 | 0.11 | no cracking |
| Comparative Example 3 | 0.19 | 0.08 | surface cracking at the impregnated side areas |
| Comparative Example 4 | 0.34 | 0.08 | severe surface cracking over the complete sample |

Interpretation of Results:

Examples 1-6 which had a protection coating according to the invention with expanded Vermiculite particles or with Disperal 60 particles showed an improvement in both fiber shedding and erosion versus the Comparative Example 1, which had no coating on its side surfaces.

Comparative Example 2 which had an edge coating with Disperal P3 showed virtually no improvement versus Comparative Example 1.

Comparative Examples 3 and 4 showed an improvement in both fiber shedding and erosion, but they showed cracking of the major mat surface.
Test Procedures
Fiber Shedding Test For the fiber shedding test an impact tester acc. to Japanese Industrial Standards JIS K-6830 was utilized. A 100 mm×100 mm mat sample was fastened to the flap of the impact tester. The flap was lifted to an angle of 45° with the frame and then dropped. This impact was applied 5 times on each sample. The weight loss of the sample mat was determined and calculated in % of the mat weight.
Erosion Test A mat sample 50 mm×40 mm was cut out of the edge coated mat in such manner that one of the 50 mm long edge surface sides was the coated side. The mat sample was mounted between 2 inconel steel plates so that the coated mat edge was level with one side of the assembly and a mount density of 0.5 g/cm³ based on the mat weight without edge coating was adjusted with spacers between the plates.

The assembly was heated to 500° C. for 2 hours and then cooled down to room temperature. Then the assembly was placed in front of an air nozzle and the mat edge was exposed to a pulsating air jet of 4 bar for 4 hours, the pulsation frequency was 200 Hz. After this the mat sample was removed and the weight loss was determined.
Cracking Test The 100 mm×100 mm mat sample was wrapped around a mandrel which had a diameter of 60 mm. The outer mat surface was visually inspected for cracks specifically along the sides of the samples.

Herein below various embodiments of the present invention are described and shown in the drawings wherein like elements are provided with the same reference numbers.

FIG. 1 a perspective view showing a typical embodiment of an exhaust gas treatment device, here a catalytic converter, according to the present invention, wherein an exploded state of the catalytic converter is illustrated for easier understanding of its constitution. The catalytic converter 10 shown in the drawing is provided with an upper part 1 and a lower part 2 of a metal casing, a monolithic solid catalyst element 3 disposed in the metal casing 1 and 2 and a mounting mat 4 disposed between the metal casing 1 and 2 and the catalyst element 3. The catalytic converter 10 is provided with an exhaust gas inlet 12 and an exhaust gas outlet 13, each of which has a shape of truncated cone.

Figure 2:
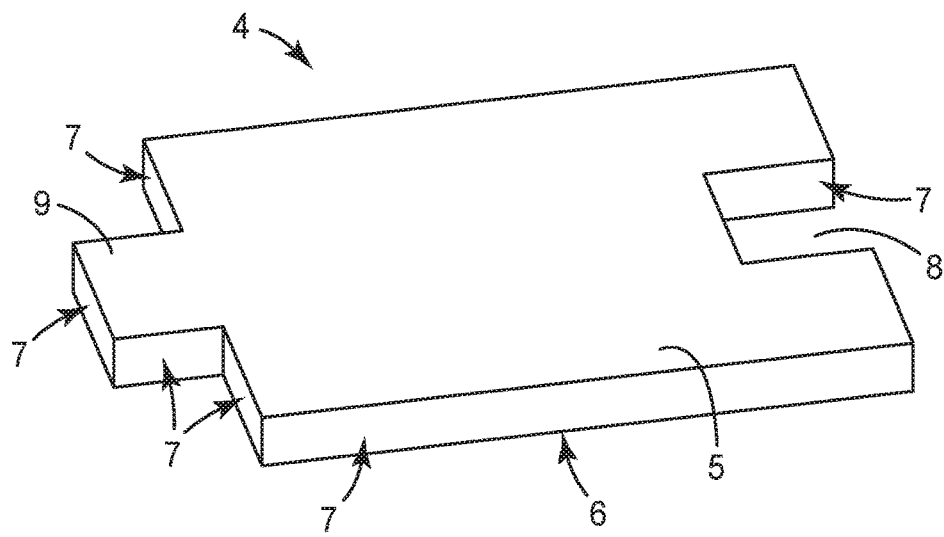
FIG. 2 is a three dimensional view of a mounting mat.

FIG. 2 is showing a three dimensional view of a mounting mat 4. The mounting mat 4 comprises an upper main surface 5 as well as a lower main surface 6. Several edge surfaces 7 is extending between the two main surfaces 5 and 6. The mounting mat 4 is substantially rectangular shaped and comprises two longer edge surfaces and two shorter edge surfaces. One of the shorter edge surfaces of the mounting mat 4 comprises a concave mating portion 8 and the other shorter edge surface of the mounting mat 4 comprises a convex mating portion 9. These two mating portions may be engaged with each other when the mounting mat is wound around a pollution control element.

Figure 3:
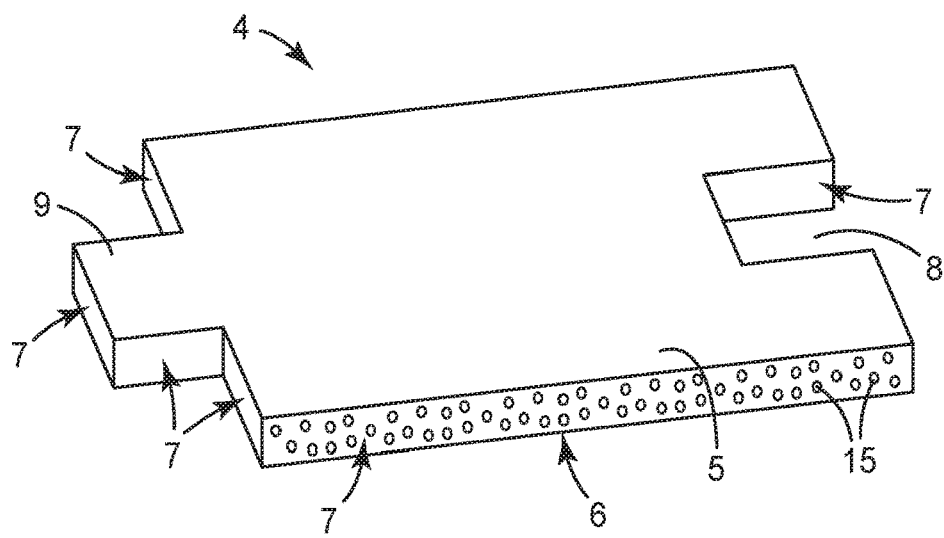
FIG. 3 is a three dimensional view of a mounting mat according to the invention and FIG. 4 is a cross sectional view of a mounting mat according to the invention.
Figure 4:
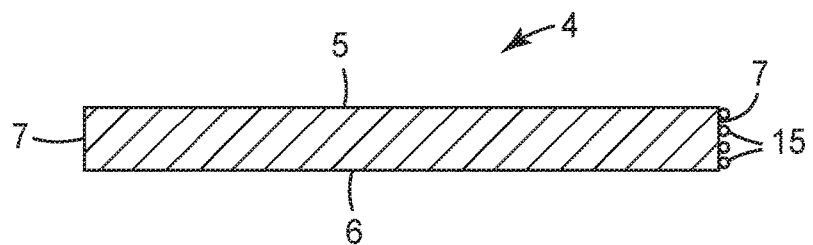

FIG. 3 shows the mounting mat of FIG. 2 with a protection coating on the front edge surface. The protection coating comprises inorganic particles 15 having an average diameter of at least 1 µm. As can be seen in FIG. 4, the particles 15 do not migrate into the thickness of the mounting mat 4, but they do stay on the surface. Of course it is possible to not only coat one edge surface of the mounting mat but to coat more than one edge surface, e.g. two edge or more surfaces.

The invention claimed is:

1. A mounting mat for an exhaust gas treatment device, the mounting mat comprising:
   inorganic fibers;
   two opposing main surfaces; and
   at least one edge surface extending between the main surfaces,
   wherein at least one portion of the at least one edge surface comprises an erosion protection coating by applying a slurry of inorganic particles so as to provide erosion protection on at least one portion of the at least one edge surface,
   wherein the inorganic particles have an average diameter of at least 10 µm, and
   wherein the inorganic particles stay on the peripheral surface of the at least one portion of at least one edge of the mat and do not penetrate into the mounting mat.

2. The mounting mat according to claim 1, wherein the mounting mat is an intumescent mounting mat, comprising intumescent material disposed in the mat.

3. The mounting mat according to claim 1, wherein the protection coating comprises inorganic particles having an average diameter of at least 1 µm and a binder.

4. The mounting mat according to claim 1, wherein the at least one portion of the at least one edge surface that comprises a protection coating is positioned on the edge surface facing an entering exhaust gas, when the mounting mat is assembled in an exhaust gas treatment device.

5. The mounting mat according to claim 4, wherein the at least one portion of the at least one edge surface that comprises a protection coating is positioned on the edge surface facing away from the entering exhaust gas, when the mounting mat is assembled in an exhaust gas treatment device.

6. The mounting mat according to claim 1, wherein at least one entire edge surface, that might be affected by erosion, comprises the erosion protection coating.

7. The mounting mat according to claim 1, wherein the average diameter of the inorganic particles of the protection coating lies within a range of 10 µm to 150 µm.

8. The mounting mat according to claim 1, wherein the inorganic particles comprise one or more of the following materials: non-intumescent vermiculite, mica; kaolinite; clays; kaolin; bentonite; laponite; hectorite; saponite; montmorillonite and/or boehmite.

9. The mounting mat according to claim 1, wherein the protection coating is free of an organic binder.

10. The mounting mat according to claim 1, wherein the only portion of the mat on which the protection coating is arranged is the at least one edge surface.

11. The mounting mat according to claim 4, wherein the only portion of the mat on which the protection coating is arranged is the at least one edge surface.

12. The mounting mat according to claim 1, wherein the portion of the mat on which the protection coating is arranged is that portion of the at least one edge surface that will be mostly affected by erosion.

13. A pollution control device comprising the mounting mat according to claim 1.

14. A method of making a mounting mat for an exhaust gas treatment device, the method comprising the steps of:
   providing a mounting mat, the mat comprising:
      inorganic fibers;
      two opposing main surfaces; and
      at least one edge surface extending between the main surfaces;
   providing at least one slurry of inorganic particles, the particles having an average diameter of at least 1 µm;
   applying the slurry so as to form an erosion protection coating of the inorganic particles onto at least one portion of at least one edge surface of the mounting mat,
   wherein at least one entire edge surface comprises the erosion protection coating.

15. The method according to claim 14, wherein the slurry comprises water and inorganic particles.

16. The method according to claim 14, wherein the slurry of inorganic particles is sprayed onto the at least one portion of at least one edge surface of the mounting mat.

17. The method according to claim 14, wherein the method comprises a drying step.

18. The method according to claim 14, the method comprising the following steps:
   providing several mounting mats;
   putting the several mounting mats onto one stack;
   bringing the slurry of inorganic particles onto at least one portion of one side of the stack of mounting mats in order to coat at least a portion of the edge surface of each mounting mat.

* * * * *